April 6, 1926. 1,579,842
F. RETTENMEYER
VANITY BOX
Filed July 16, 1925   2 Sheets-Sheet 1
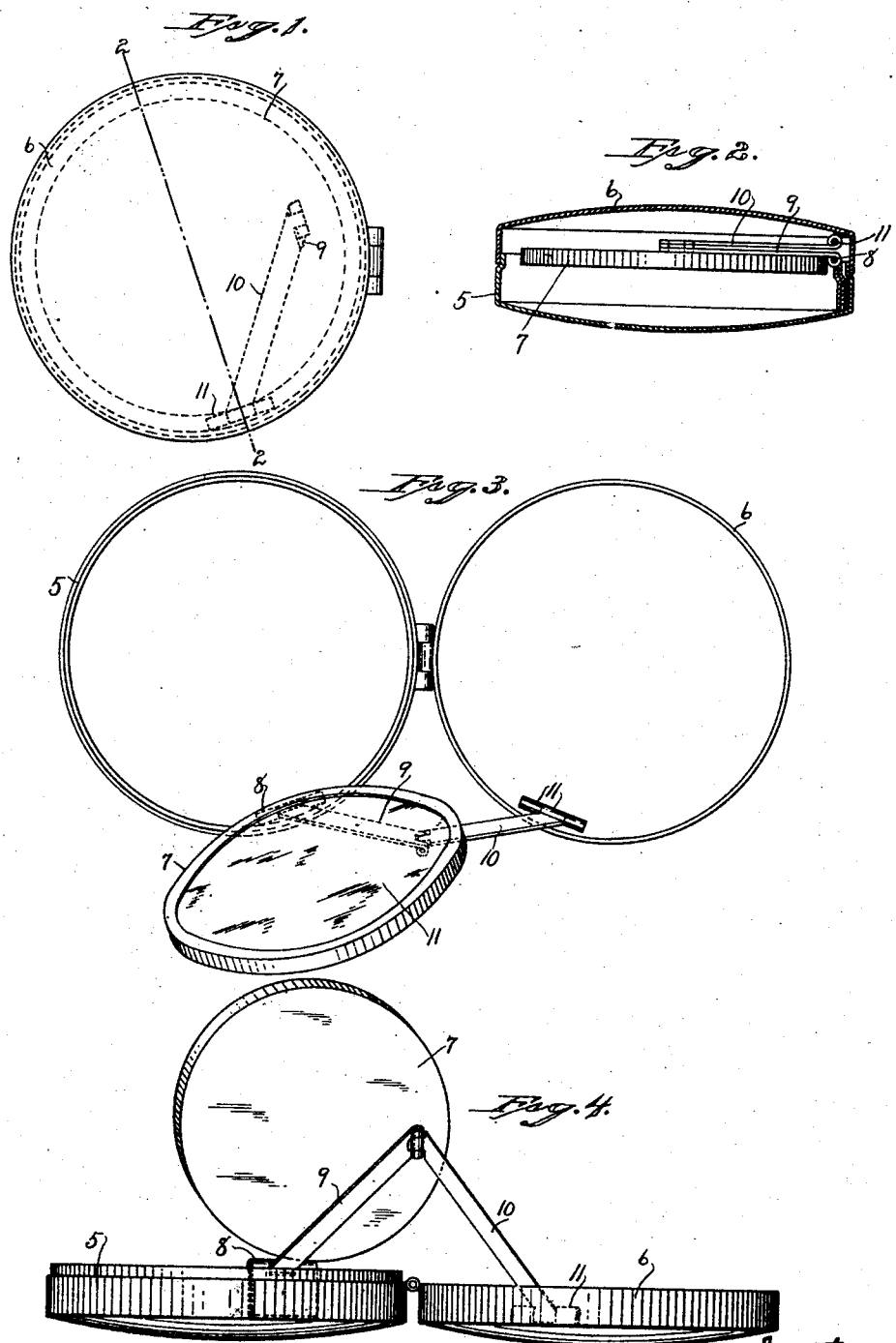

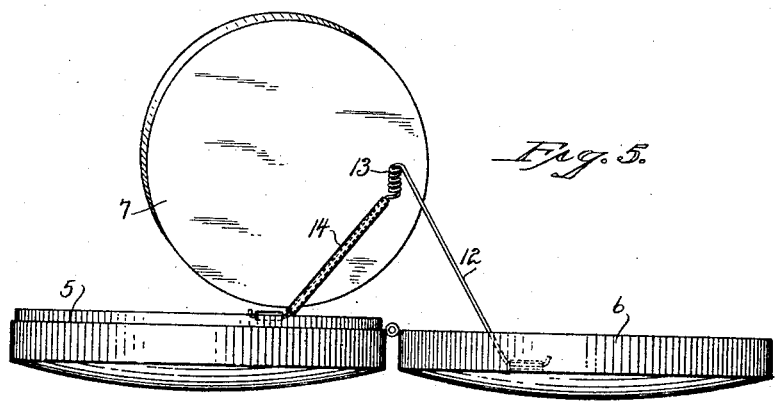
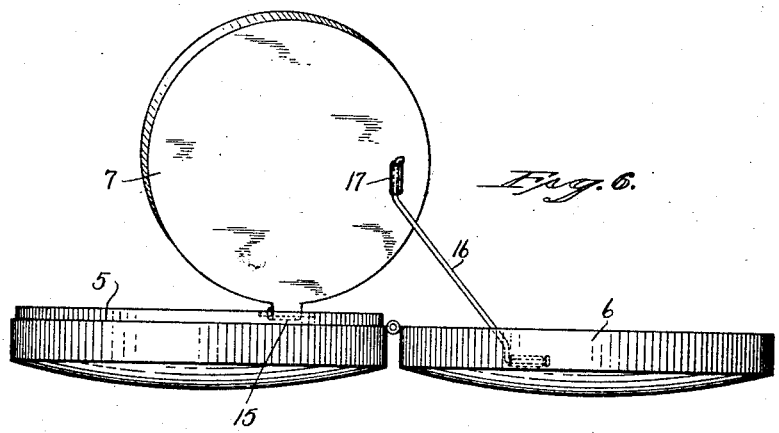

Patented Apr. 6, 1926.

1,579,842

UNITED STATES PATENT OFFICE.

FREDERICK RETTENMEYER, OF MERIDEN, CONNECTICUT, ASSIGNOR TO THE NAPIER CO., OF MERIDEN, CONNECTICUT, A CORPORATION.

VANITY BOX.

Application filed July 16, 1925. Serial No. 43,895.

*To all whom it may concern:*

Be it known that I, FREDERICK RETTENMEYER, a citizen of the United States, residing at Meriden, in the county of New Haven and State of Connecticut, have invented a new and useful Improvement in Vanity Boxes; and I do hereby declare the following, when taken in connection with the accompanying drawings and the characters of reference marked thereon, to be a full, clear, and exact description of the same, and which said drawings constitute part of this application, and represent, in—

Fig. 1 a plan view of a vanity box constructed in accordance with my invention.

Fig. 2 a transverse, sectional view of the same.

Fig. 3 a plan view in an open position.

Fig. 4 a rear view of the same.

Fig. 5 a similar view, showing a spring-hinge.

Fig. 6 a similar view, showing another modified form of hinge.

This invention relates to an improvement in vanity boxes, and while particularly adapted for this purpose, the invention may be used in a variety of forms. Vanity boxes comprising a holder for powder and rouge have been provided, but generally a mirror has been mounted in the cover and another one in the box, with a double compact between them, but this has necessitated opening the box on one side for rouge, for instance, and then reversing the box and opening the other side for powder, and unless some distinguishing mark is placed on the outside of the box, one is not sure which side is to be opened. In either event, two mirrors are required, making the box heavy and comparatively thick. The object of the invention is to provide a vanity box with a mirror connected to both the box and cover, so that when the box is open, the mirror will be brought into position, and the invention consists in the construction as hereinafter described and particularly recited in the claims.

In carrying out my invention, I employ a vanity box 5, preferably but not necessarily round, and provided with a cover 6, as in the usual construction of boxes of this type. A plate 7 is connected with the box by a hinge 8, the strap-member 9 of which is secured to the plate, and pivotally connected with the end of the strap 9 is a strap 10, which is connected with the cover 6 by a hinge 11. Mounted on the plate 7 is a mirror 11. The straps 9 and 10 are so arranged that when the cover is turned to its closed position, the mirror will be folded into the top of the box, and, likewise, when the cover is opened, the mirror is raised to an inclined position. The box is adapted to contain the usual powder container, and the cover likewise to receive a rouge compact holder, and by thus connecting the mirror with the compact, the material in the box and cover are both exposed for use at the same time, and a comparatively thin case is produced, and the box and cover form a support for the mirror when in the open position, so that the device may be placed upon a table or other support.

While this construction is particularly adapted for vanity boxes, it might be used for other purposes, such, for instance, as cigarette boxes, the plate 7 being adapted to carry a package of matches,—this construction being too obvious to require illustration.

Instead of using straps to hinge the plate 7 to the box and cover, I may employ a wire 12 formed between its ends with a coil 13, one end of the wire extending through a tube 14 secured to the back of the plate 7 and into hinge connection with the box, the other end of the wire extending to and hinged to the cover, as shown in Fig. 5; or the plate may be secured to the box by a hinge 15 and the plate connected with the cover by a wire 16, one end of which extends through a loop 17 on the plate and the other end hinged to the cover, as shown in Fig. 6.

I claim:

1. The combination with a box, of a cover hinged thereto, a plate hinged to one member, a strap hinged at one end to the other member, and at the opposite end to said plate, whereby, when the box is opened, the plate is lifted to clear both the box and the cover.

2. The combination with a box, of a cover hinged thereto, two straps, one hinged to the box and the other hinged to the cover, the ends of the straps hinged together, and a plate secured to one of said straps.

In testimony whereof, I have signed this specification.

FREDERICK RETTENMEYER.